United States Patent
Yanagihara

(10) Patent No.: US 6,981,189 B2
(45) Date of Patent: Dec. 27, 2005

(54) INTERFACE CIRCUIT

(75) Inventor: Junichi Yanagihara, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 380 days.

(21) Appl. No.: 10/252,687

(22) Filed: Sep. 24, 2002

(65) Prior Publication Data

US 2004/0078713 A1   Apr. 22, 2004

(30) Foreign Application Priority Data

Oct. 10, 2001   (JP) .............................. 2001/312068

(51) Int. Cl.[7] .................. G01R 31/28; H03K 19/0175
(52) U.S. Cl. ....................................... 714/724; 326/62
(58) Field of Search ................................. 714/724, 734, 714/736, 745, 819, 811, 816; 326/30, 21, 326/31, 32, 62, 68; 324/430, 433, 600, 606, 324/679, 691; 438/466; 710/107, 100

(56) References Cited

U.S. PATENT DOCUMENTS 6,294,932 B1 * 9/2001 Watarai ....................... 326/83
6,509,755 B2 * 1/2003 Hernandez-Marti .......... 326/30
2002/0145443 A1 * 10/2002 Partow et al. ................ 326/30

* cited by examiner

Primary Examiner—Christine T. Tu

(74) Attorney, Agent, or Firm—Rabin & Berdo, PC

(57) ABSTRACT

There is disclosed an interface circuit capable of correcting the resistance value of a terminator according to a change in an ambient temperature or the like without causing any distortion in an output waveform during data transmitting, and any reception errors during data receiving. In this case, the interface circuit comprises: a data input/output terminal; a data driver; a data receiver; terminators corrected for resistance values; a detection circuit; and a correction circuit. The detection circuit detects the stoppage of data transmitting/receiving by detecting the predetermined states of potentials respectively of a D+ terminal and a D− terminal. The correction circuit outputs a control signal CTRL to each of the terminators when the result of the detection by the detection circuit shows the stoppage of the data transmitting/receiving. The resistance value of each of the terminators is corrected in response to the control signal CTRL outputted from the correction circuit.

17 Claims, 7 Drawing Sheets

INTERFACE CIRCUIT

BACKGROUND OF THE INVENTION

1. Field of the Invention

The present invention relates to an interface circuit, and more particularly, it relates to an interface circuit provided with means for correcting a resistance value of a terminator.

2. Description of the Related Art

Universal Serial Bus (USB) 2.0 interface circuit has been available as an interface circuit designed to provide high-speed serial data transfer. The USB 2.0 interface circuit has a high-speed transfer rate and, to suppress signal reflection, the impedance matching of a transmission system is important. For impedance matching, a terminator having a predetermined resistance value is provided. However, changes occur in the resistance value of the terminator because of changes in an ambient temperature, and other factors, causing impedance mismatching. Accordingly, the conventional interface circuits included the following types: an interface circuit provided with means for correcting the resistance value of the terminator at the time of resetting; an interface circuit provided with means for correcting the resistance value of the terminator only immediately after reset releasing; and an interface circuit provided with means for correcting the resistance value of the terminator at every constant periods after reset releasing.

However, in the case of the types respectively provided with the means for correcting the resistance value of the terminator at the time of resetting, and the means for correcting the resistance value of the terminator only immediately after the reset releasing, characteristic impedance was not satisfied when a long-time continuous operation caused a change in the resistance value of the terminator. In addition, in the case of the type provided with the means for correcting the resistance value at every constant periods after the reset releasing, the resistance value was corrected even during the transmitting/receiving of data, causing distortion in an output waveform at the time of the data transmission, and a reception error at the time of the data receiving.

SUMMARY OF THE INVENTION

The present invention was made to solve the foregoing problems. According to the present invention, a representative interface circuit comprises: a data input/output terminal; a data driver; a data receiver; a terminator; a detection circuit; and a correction circuit. The data input/output circuit composed of a first terminal for inputting/outputting a first signal constituting a differential signal, and a second terminal for inputting/outputting a second signal having a phase reverse to that of the first signal constituting the differential signal. The data driver outputs data through the data input/output terminal. The data receiver fetches data through the data input/output terminal. The terminator is connected to the data input/output terminal, and corrected for a resistance value. The detection circuit detects the stoppage of data transmitting/receiving by detecting the predetermined states of potentials respectively of the first and second terminals. The correction circuit outputs a control signal to the terminator when the detection result of the detection circuit shows the stoppage of data transmitting/receiving.

DESCRIPTION OF THE PREFERRED EMBODIMENTS

Next, preferred embodiments of the present invention will be described with reference to the accompanying drawings. The interface circuit of the present invention is one used for data transmission by a differential signal. Hereinafter, the example of an interface circuit used as a Universal Serial bus (USB) 2.0 interface will be described. In this case, characteristic impedance of 45 Ω±10% (40.5 Ω to 49.5 Ω) must be satisfied in the USB 2.0 interface.

First Embodiment

Figure 1:
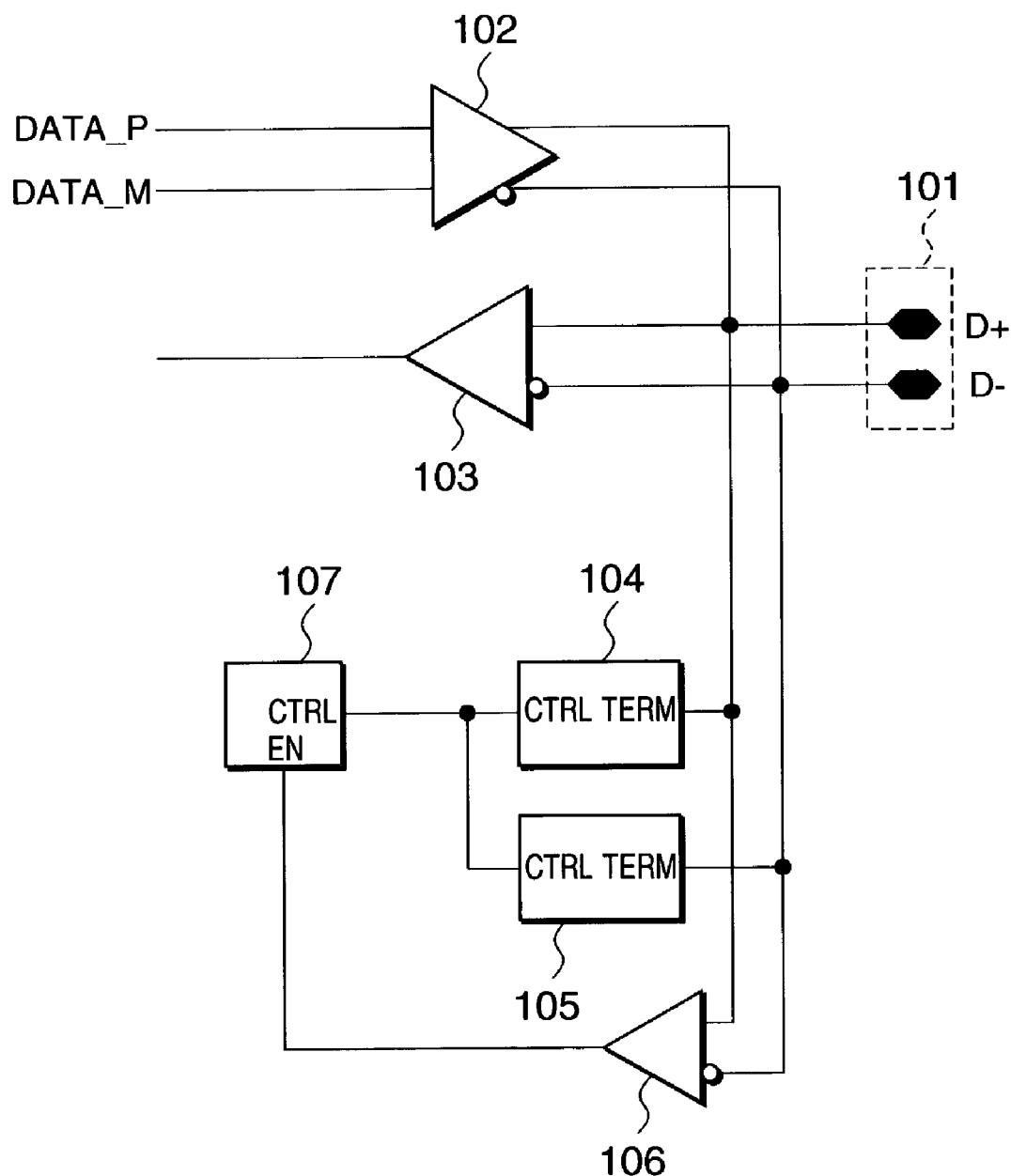
FIG. 1 is a circuit diagram showing an interface circuit according to a first embodiment of the present invention.

First, description will be made of the entire circuitry of the interface circuit of the present invention. FIG. 1 is a circuit diagram showing an interface circuit according to the first embodiment of the present invention. The interface circuit of the present invention comprises: a data input/output terminal 101 composed of a first terminal (D+ terminal) for inputting/outputting a positive-phase signal (first signal) constituting a differential signal, and a second terminal (D− terminal) for inputting/outputting a reverse-phase signal (second signal) constituting the differential signal; a data driver 102 for outputting data through the data input/output terminal 101; a data receiver 103 for fetching data through the data input/output terminal 101; terminators 104 and 105; a detection circuit 106 for detecting the stoppage of data transmitting/receiving; and a correction circuit 107 for correcting the resistance values of the terminators 104 and 105 when the data transmitting/receiving is in a stopped state.

The data driver 102 includes two input terminals connected to an internal circuit (not shown), and two output terminals connected to the data input/output terminal 101. This data driver 102 converts a logic signal (Data_P and Data_M) inputted from the internal circuit into a differential signal, and outputs it to the data input/output terminal 101. The Data_P and Data_M are logic signals taking opposite logic levels. The data receiver 103 includes two input terminals connected to the data input/output terminal 101, and an output terminal connected to the internal circuit (not shown). This data receiver 103 converts the differential signal inputted from the data input/output terminal 101 into a logic signal, and outputs it to the internal circuit. The terminator 104 is connected to the D+ terminal, while the terminator 105 is connected to the D− terminal.

The terminator 104 includes: a CTRL terminal connected to the correction circuit 107, and adapted to receive a control signal CTRL inputted from the correction circuit 107; and a TERM terminal connected to the data input/output terminal 101. The resistance value of the terminator 104 is corrected based on the control signal CTRL. The terminator 105 includes: a CTRL terminal connected to the correction circuit 107, and adapted to receive a control signal CTRL inputted from the correction circuit 107; and a TERM terminal connected to the data input/output terminal 101. The resistance value of the terminator 105 is corrected based on the control signal CTRL.

The detection circuit 106 includes an input terminal corrected to the D+ terminal, an input terminal connected to the D− terminal, and an output terminal connected to the correction circuit 107. This detection circuit 106 is a comparator adapted to detect the predetermined states of the potentials of the D+ and D− terminals, and output the result of the detection as a logic signal to the correction circuit 107. On the highs-speed (HS) transfer mode of the UAB 2.0 standard, a difference in potentials between the D+ and D− terminals is 0 V while data transmitting/receiving is in a stopped state (idle state). The detection circuit 106 outputs the signals of reverse logical levels during data transmitting/receiving carried out through the data input/output terminal and during the stoppage thereof. In the embodiment, the comparator 106 outputs the signal of a low level (referred to "L", hereinafter) during the data transmitting/receiving, and the signal of a high level (referred to "H", hereinafter) during the stoppage of the data transmitting/receiving).

The correction circuit 107 includes an EN terminal for receiving a signal outputted from the detecting circuit 106, and a CTRL terminal for outputting a control signal CTRL to each of the terminators 104 and 105. In other words, the correction circuit 107 is adapted to correct the resistance values of the terminators 104 and 105 during the stoppage of the data transmitting/receiving.

Figure 2:
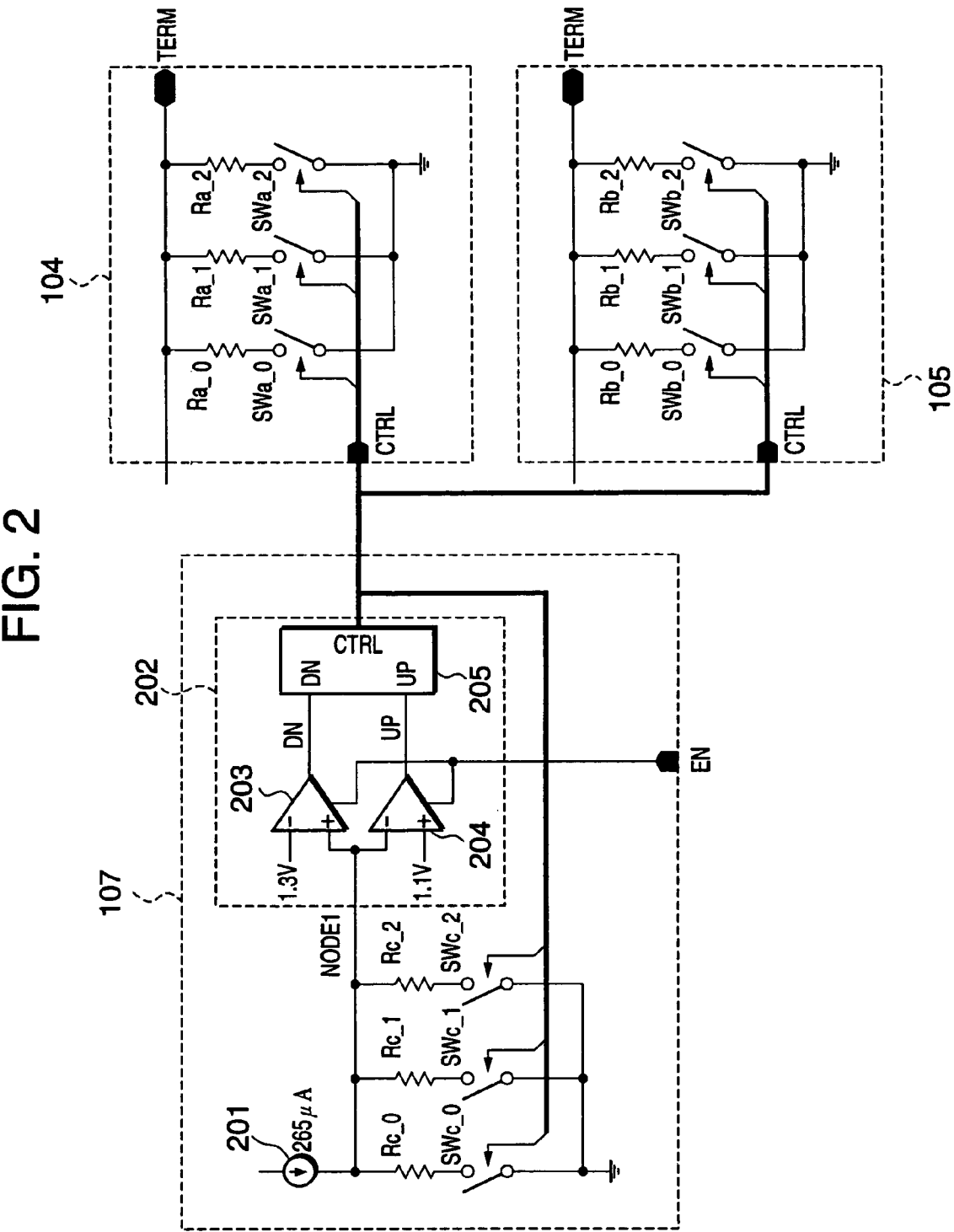
FIG. 2 is a circuit diagram showing terminators 104 and 105, and a correction circuit of FIG. 1.

Next, detailed description will be made of the terminators 104 and 105, and the correction circuit 107 by referring to FIG. 2. FIG. 2 is a circuit diagram showing the terminators 104 and 105, and the correction circuit 107. The terminator 104 includes a plurality of resistors (Ra_0, Ra_1, and Ra_2 ) connected in parallel, and a plurality of switches (SWa_0, SWa_1, and SWa_2 ) respectively connected to the resistors. Ends of the plurality of resistors are connected in common to the TERM terminal, and the other ends are connected to the switches. In the embodiment, the resistors (Ra_0, Ra_1, and Ra_2 ) are respectively set to (41 Ω, 45 Ω, and 49 Ω). Ends of the plurality of switches are respectively connected to the resistors, and the other ends are connected in common to a ground node. Each switch is set in an ON/OFF state in response to a control signal CTRL outputted from the correction circuit 107. In the embodiment, any one of the switches SWa_0, SWa_1, and SWa_2 is set in an ON state in response to a 3-bit control signal CTRL.

The terminator 105 includes a plurality of resistors (Rb_0, Rb_1, and Rb_2 ) connected in parallel, and a plurality of switches (SWb_0, SWb_1, and SWb_2 ) respectively connected to the resistors. Ends of the plurality of resistors are connected in common to the TERM terminal, and the other ends are connected to the switches. In the embodiment, the resistors (Rb_0, Rb_1, and Rb_2 ) are respectively set to (41 Ω, 45 Ω, and 49 Ω). Ends of the plurality of switches are respectively connected to the resistors, and the other ends are connected in common to a ground node. Each switch is set in an ON/OFF state in response to a control signal CTRL outputted from the correction circuit 107. In the embodiment, any one of the switches SWb_0, SWb_1, and SWb_2 is set in an ON state in response to a 3-bit control signal CTRL.

The correction circuit 107 includes a plurality of resistors (Rc_0, Rc_1, and Rc_2 ) connected in parallel, a plurality of switches (SWc_0, SWc_1, and SWc_2 ) respectively connected to the resistors, a current source 201 for supplying currents to the resistors, and a comparator circuit 202. One end of each resistor is connected to the current source 201, and the other end is connected to each switch. In the embodiment, the resistance values of the resistors (Rc_0, Rc_1, and Rc_2 ) are respectively set to (4.1 kΩ, 4.5 kΩ, and 4.9 kΩ). In this case, a node, to which the plurality of resistors are connected in common, is set as a node 1. One end of each switch is connected to each resistor, and the other end is connected to a ground node. Each switch is set in an ON/OFF state in response to a control signal CTRL outputted from the comparator circuit 202. In the embodiment, any one of the switches SWc_0, SWc_1, and SWc_2 is set in an ON state in response to a 3-bit control signal CTRL. The current source 201 outputs a current of 265 μA.

The comparator circuit 202 compares the potential of the node 1 with a reference potential having a range of 1.3 V to 1.1 V in response to a signal of "H" inputted to the EN terminal of the correction circuit 107, and outputs the control signal CTRL to the terminators 104 and 105, and the correction circuit 107. This comparator circuit 202 includes first-and second comparators 203 and 204, and a shift register 205. The first comparator 203 includes an input terminal (+ terminal) connected to the node 1, an input terminal (− terminal), to which the reference potential is applied, and an output terminal for outputting the result of comparison between the potential of the node 1 and the reference potential. In this case, the reference potential applied to the − terminal of the first comparator 203 is 1.3 V. The first comparator 203 compares the potential of the node 1 with the reference potential (1.3 V) in response to the signal of "H" inputted to the EN terminal of the correction circuit 107, and outputs its result. In other words, the first comparator 203 is a circuit adapted to compare the potential of the node 1 with the reference potential (1.3 V) during the stoppage of the data transmitting/receiving. The first comparator 203 outputs a signal of "H" (referred to as "DN signal", hereinafter) when the potential of the node 1 is higher than the reference potential (1.3 V), and a signal of "L" when the potential of the node 1 is lower than the reference potential (1.3 V). The second comparator 204 includes an input terminal (− terminal) connected to the node 1, an input terminal (+ terminal), to which a reference potential is applied, and an output terminal for outputting the result of comparison between the potential of the node 1 and the reference potential. In this case, the reference potential applied to the + terminal of the second comparator 2 is 1.1 V. The second comparator 204 compares the potential of the node 1 with the reference potential (1.1 V) in response to the signal of "H" inputted to the EN terminal of the correction circuit 107, and outputs its result. In other words, the second comparator 204 is a circuit adapted to compare the potential of the node 1 with the reference potential (1.1 V) during the stoppage of the data transmitting/receiving. The second comparator 204 outputs a signal of "H" (referred to as "UP signal", hereinafter) when the potential of the node 1 is lower than the reference potential (1.1 V), and a signal of "L" when the potential of the node 1 is higher than the reference potential (1.1 V). The shift register 205 performs a shifting operation in response to the DN signal outputted from the first comparator 203, or the UP signal outputted from the second comparator 204, and outputs a control signal CTRL.>

The 3-bit control signal CTRL outputted from the shift register 205 controls the switches (SWa_0, SWa_1, and SWa_2) of the terminator 104, the switches (SWb_0, SWb_1, and SWb_2) of the terminator 105, and the switches (SWc_0, SWc_1, and SWc_2) of the correction circuit 107 in the following manner. That is, when the control signal CTRL is "001", the switches (SWa_0, SWa_1, and SWa_2) of the terminator 104 are respectively set to (ON, OFF, and OFF), the switches (SWb_0, SWb_1, and SWb_2) of the terminator 105 to (ON, OFF, and OFF), and the switches (SWc_0, SWc_1, and SWc_2) of the correction circuit 107 to (ON, OFF, and OFF). When the control signal CTRL is "010", the switches (SWa_0, SWa_1, and SWa_2) of the terminator 104 are respectively set to (OFF, ON, and ON), the switches (SWb_0, SWb_1, and SWb_2) of the terminator 105 to (OFF, ON, and OFF), and the switches (SWc_0, SWc_1, and SWc_ 2) of the correction circuit 107 to (OFF, ON, and OFF). When the control signal CTRL is "100", the switches (SWa 0, SWa_1, and SWa_2) of the terminator 104 are respectively set to (OFF, OFF, and ON), the switches (SWb_0, SWb_1, and SWb_2) of the terminator 105 to (OFF, OFF, and ON), and the switches (SWc_0, SWc_1, and SWc_2) of the correction circuit 107 to (OFF, OFF, and ON).

Now, description will be made of a relation between the output signals DN and UP respectively from the first and second comparators 203 and 204 and the operation of the shift register 205. For example, in a state where the shift register 205 outputs the control signal CTRL of "010", in other words, in a state where the switches SWa_1, SWb_1, and SWc_1 of the terminators 104 and 105, and the correction circuit 107 are ON, when the DN signal is outputted from the first comparator 203 (when the potential of the node 1 is lower than the reference potential 1.1 V), the shift register 205 executes a 1-bit down-shifting operation to output a control signal CTRL of "001". In response to this control signal CTRL of "001", the switches SWa_0, SWb_0, and SWc_0 of the terminators 104 and 105, and the correction terminal 107 are set to ON. In addition, in a state where the shift register 205 outputs the control signal CTRL of "010", in other words, in a state where the switches SWa_1, SWb_1, and SWc_1 of the terminators 104 and 105, and the correction circuit 107 are ON, when the UP signal is outputted from the second comparator 204 (when the potential of the node 1 exceeds the reference potential 1.3 V), the shift register 205 executes a 1-bit up-shifting operation to output a control signal CTRL of "100". In response to this control signal CTRL of "100", the switches SWa_2, SWb_2, and SWc_2 of the terminators 104 and 105, and the correction circuit 107 are set to ON. In the embodiment, the control signal CTRL as the output of the shift register 205 is changed in synchronization with the DN signal or the UP signal. However, the control signal CTRL may be changed in synchronization with a clock signal inputted to the shift register 205.

Now, description will be made of the fact that the foregoing constitution enables the resistance values of the terminators 104 and 105 of the interface circuit of the present invention to satisfy the characteristic impedance 45 Ω±10% of the USB 2.0 standard. The potential of the node 1 of the correction circuit 107 is set in the range of 1.1 V to 1.3 V by the comparator circuit 202. First, explanation is made of the resistance values of the terminator 104 and 105 when the potential of the node 1 is 1.1 V. When the potential of the node 1 is 1.1 V, the resistance value of the resistor of the correction circuit 107 is 1.1 V/265 μA≈4151 Ω. The resistors of the terminators 104 and 105 corresponding to the resistor of the correction circuit 107 are designed so as to have resistance values larger by 100 times than that of the resistor provided in the correction circuit 107. Thus, when the potential of the node 1 is 1.1 V, the resistance values of the resistors provided in the terminators 104 and 104 are 41.51 Ω. This value satisfies the characteristic impedance 45 Ω−10% (=40.5 Ω) of the USB 2.0 standard. Next, explanation is made of the resistance values of the terminators 104 and 105 when the potential of the node 1 of the correction circuit 107 is 1.3 V. When the potential of the node 1 is 1.3 V, the resistance value of the resistor provided in the correction circuit 107 is 1.3 V/265 μA≈4905 Ω. The resistors of the terminators 104 and 105 corresponding to the resistor of the correction circuit 107 are designed to have resistance values larger by 100 times than that of the resistor provided in the correction circuit 107. Thus, when the potential of the node 1 is 1.3 V, the resistance values of the resistors of the terminators 104 and 105 are 49.05 Ω. This value satisfies the characteristic impedance 45 Ω±10% (=49.5 Ω) of the USB 2.0 standard. The constitution of the embodiment enables the characteristic impedance 45 Ω±10% of the USB 2.0 standard to be satisfied even when a changed ambient temperature or the like causes changes in the resistance values of the terminators 104 and 105.

In the foregoing embodiment, the terminators 104 and 105 included the resistors and the switches as shown in FIG. 2. However, as another example, a plurality of transistors connected in parallel may be provided, and ON resistance of the transistors can be used.

Figure 3:
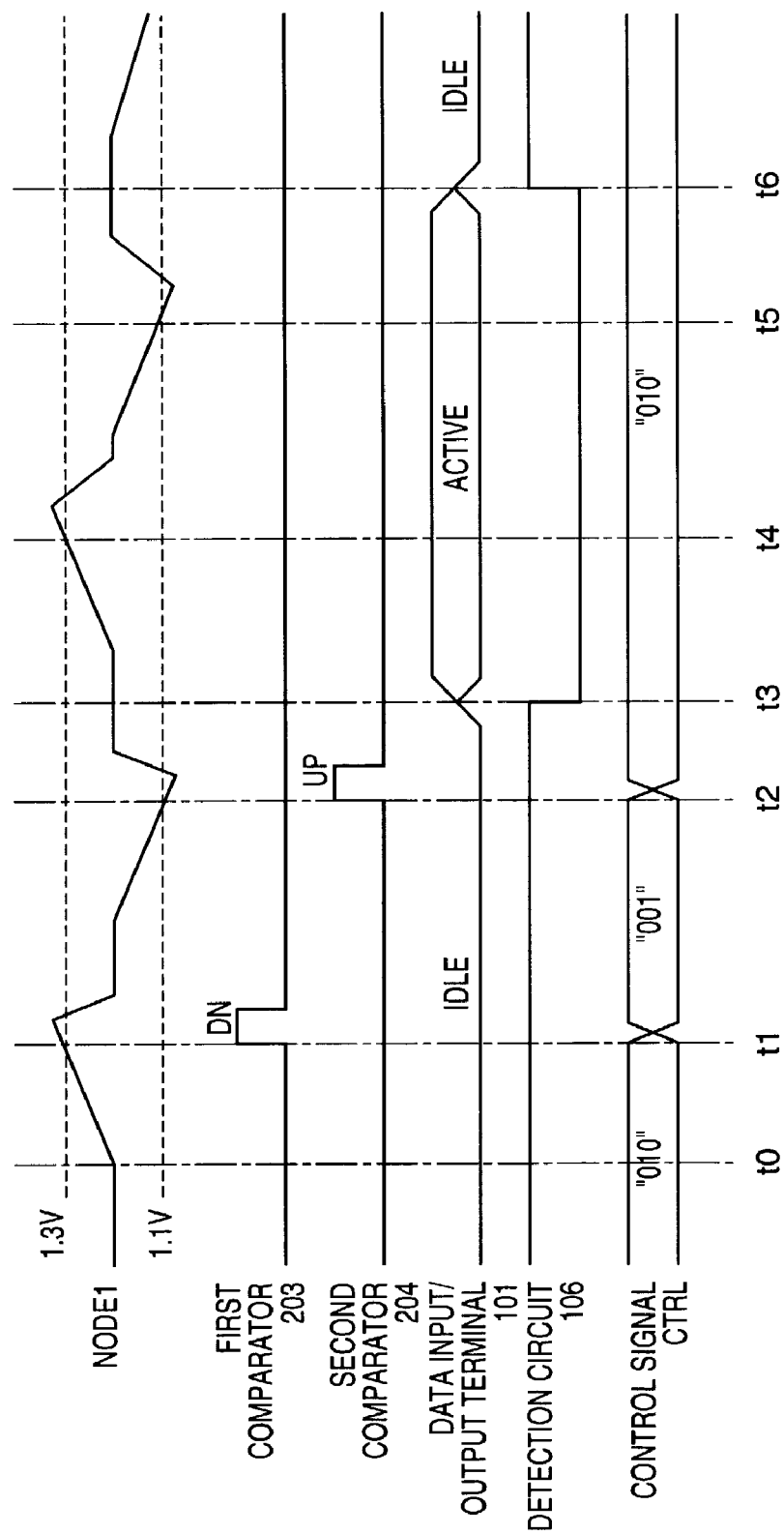
FIG. 3 is a time chart showing an operation of the interface circuit of the first embodiment.

Next, description will be made of the operation of the interface circuit shown in FIGS. 1 and 2 by referring to FIG. 3. FIG. 3 is a time chart showing the operation of the interface circuit of the first embodiment. Time is shown in the horizontal direction of FIG. 3. In the longitudinal direction of FIG. 3, there are shown in order from above, the potential of the node 1 (graph (1)), the output of the first comparator 203 (graph (2)), the output of the second comparator 204 (graph (3)), the state of the data input/output terminal (D+ terminal, and D− terminal) 101 (graph (4)), the output of the detection circuit 106 (graph (5)), and the control signal CTRL (graph (6)). Here, the example of data transfer executed on the high-speed (HS) transfer mode of the USN 2.0 standard is described.

At time t0, the data input/output terminal 101 is in a data transmitting/receiving stopped state (idle state; represented by Idle in the drawing) (graph (4)). While the data input/output terminal 102 is in the idle state, a potential difference between the D+ terminal and the D− terminal is 0 V. Accordingly, the output signal of the detection circuit 106 is "H" (graph (5)). The correction circuit 107 is in a state of being permitted to correct the resistance values of the terminators 104 and 105 (enable state) because of the reception of the signal of "H" outputted from the detection circuit 106. A control signal CTRL of "010" has been outputted from the shift register 205 (graph (6)), and thus the switches SWc_1, SWa_1 and SWb_1 of the correction circuit 107, and the terminators 104 and 105 are in ON states.

At time t1, when a changed ambient temperature or the like causes a change in the resistance value of the resistor provided in the correction circuit 107, and the potential of the node 1 exceeds the reference potential (1.3 V) (graph (1)), a signal of "H" (DN signal) is outputted from the first comparator 203 (graph (2)). The shift register 205 executes a 1-bit down-shifting operation in response to this DN signal, and outputs a control signal CTRL of "001" (graph (6)). The switches (SWc_0, SWc_1, and SWc_2) of the correction circuit 107 are respectively set to (ON, OFF, and OFF) in response to the control signal CTRL of "001", and the selection of the resistor Rc_0 lowers the potential of the node 1 to the range of 1.1 V to 1.3 V (graph (1)). In this case, in response to the control signal CTRL of "001", the switches (SWa_0, SWa_1, and SWa_2 ) of the terminator 104 are respectively set to (ON, OFF, and OFF), and the switches (SWb_0, SWb_1, and SWb_2 ) of the terminator 105 to (ON, OFF, and OFF). By this operation, the resistors Ra_0, and Rb_0 respectively of the terminators 104 and 105 are selected. As described above, the setting of the potential of the node 1 of the correction circuit 107 in the range of 1.1 V to 1.3 V enables the resistance values of the terminators 104 and 105 to satisfy the characteristic impedance 45 Ω±10%.

At time t2, when a changed ambient temperature or the like causes a change in the resistance value of the resistor of the correction circuit 107, and the potential of the node 1 drops below the reference potential (1.1 V) (graph (1)), a signal of "H" (UP signal) is outputted from the second comparator 204 (graph (3)). The shift register 205 executes a 1-bit up-shifting operation in response to this UP signal, and outputs a control signal CTRL of "010" (graph (6)). The switches (SWc_0, SWc_1, and SWc_2 ) of the correction circuit 107 are respectively set to (OFF, ON, and OFF) in response to the control signal CTRL of "010", and the selection of the resistor Rc_1 increases the potential of the node 1 to the range of 1.1 V to 1.3 V (graph (1)). In this case, in response to the control signal CTRL of "010", the switches (SWa_0, SWa_1, and SWa_2 ) of the terminator 104 are respectively set to (OFF, ON, and OFF), and the switches (SWb_0, SWb_1, and SWb_2 ) of the terminator 105 to (OFF, ON, and OFF). By this operation, the resistors Ra_1, and Rb_1 respectively of the terminators 104 and 105 are selected. As described above, the setting of the potential of the node 1 of the correction circuit 107 in the range of 1.1 V to 1.3 V enables the resistance values of the terminators 104 and 105 to satisfy the characteristic impedance 45 Ω±10%.

At time t3, when data transmitting/receiving is started, the data input/output terminal 101 is set in an active state (represented by Active in the drawing) (graph (4)). The active state of the data input/output terminal 101 generates a difference in potentials between the D+ terminal and the D− terminal, and detection circuit 106 outputs a signal of "L" (graph (5)). In response to this signal of "L", the correction circuit 107 is set in a state of being inhibited to correct the resistance values of the terminators 104 and 105 (disable state).

At time t4, when a changed ambient temperature or the like causes a change in the resistance value of the resistor of the correction circuit 107, and the potential of the node 1 exceeds the reference potential (1.3 V) (graph (1)), the first comparator 203 is in an operation stopped state because of its reception of the signal of "L" outputted from the detection circuit 106. Accordingly, the first comparator 203 outputs no DN signals (graph (2)), and the shift register 205 maintains the output of the control signal CTRL of "010" (graph (6)).

At time t5, when a changed ambient temperature or the like causes a change in the resistance value of the resistor of the correction circuit 107, and the potential of the node 1 drops below the reference potential (1.1 V) (graph (1)), the second comparator 204 is in an operation stopped state because of its reception of the signal of "L" outputted from the detection circuit 106. Accordingly, the second comparator 204 outputs no UP signals (graph (3)), and the shift register 205 maintains the output of the control signal CTRL of "010" (graph (6)).

At time t6, when the data transmitting/receiving is stopped, the data input/output terminal 101 is set in an idle state (represented by Idle in the drawing) (graph (4)). While the data input/output terminal 101 is in the idle state, a potential difference between the D+ terminal and the D− terminal is 0 V, and the detection circuit 106 outputs a signal of an "H" level (graph (5)). In response to this signal of the "H" level, the correction circuit 107 is set in a state of being permitted to correct the resistance values of the terminators 104 and 105 (enable state). Thereafter, the operations of the interface circuit when the potential of the node 1 exceeds the reference potential (1.3 V), and when the potential of the node 1 drops below the reference value (1.1 V) are respectively similar to those of the interface circuit at time t1 and t2.

As described above, the interface circuit of the embodiment comprises: the detection circuit 106 for detecting the stoppage of the data transmitting/receiving by detecting a difference in potentials between the first terminal (D+ terminal) and the second terminal (D− terminal); and the correction circuit 107 for correcting the resistance values of the terminators 104 and 105 in response to the output signal of the detection circuit 106. By inhibiting the resistance values of the terminators to be corrected during the data transmitting/receiving, it is possible to suppress the distortion of an output waveform during the data transmitting, and a reception error during the data receiving, which are caused by a change in the characteristic impedance during correction.

Second Embodiment

Figure 4:
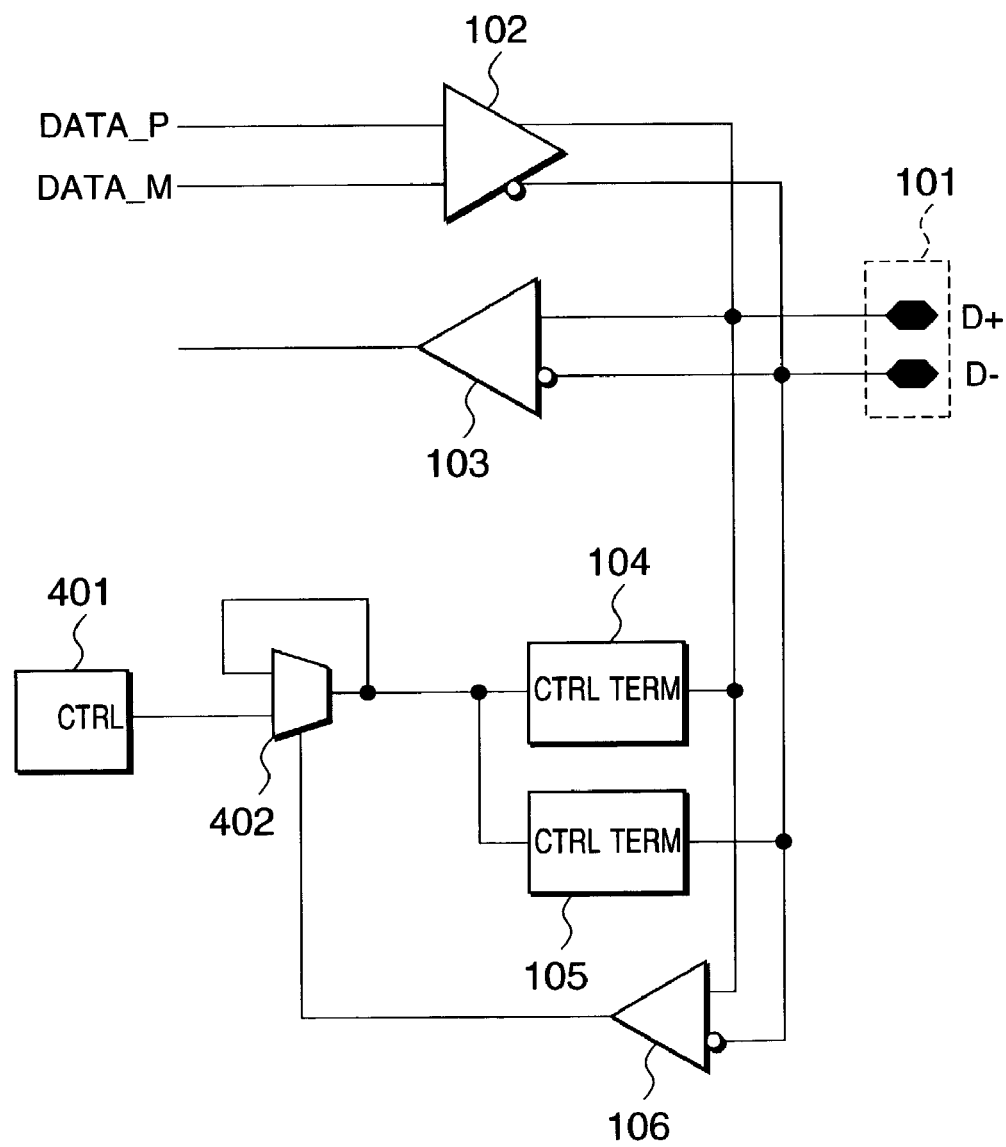
FIG. 4 is a circuit diagram showing an interface circuit according to a second embodiment of the present invention.

Next, description will be made of an interface circuit according to the second embodiment of the present invention. FIG. 4 is a circuit diagram showing the interface circuit of the second embodiment of the present invention. The interface circuit shown in FIG. 4 is different from the one shown in FIG. 1 in that a correction circuit 401 is provided in place of the correction circuit 107 of FIG. 1, and selecting means 402 is newly provided. Other components are similar to those of the interface circuit shown in FIG. 1, and denoted by similar reference numerals.

The correction circuit 401 constantly monitors a change in an ambient temperature or the like irrespective of the output signal of the detection circuit 106, and outputs a control signal CTRL. The selecting means 402 is a selector adapted to select and output either one of a new control signal CTRL inputted from the correction circuit 401 and a currently used control signal CTRL previously inputted from the correction circuit 401 in response to the output signal of the detection circuit 106. In the embodiment, when a signal of "H" is outputted from the detection circuit 106, in other words, during the stoppage of data transmitting/receiving, the control signal CTRL newly inputted from the correction circuit 401 is selected and outputted. When a signal of "L" is outputted from the detection circuit 106, in other words, during the execution of the data transmitting/receiving, the currently used control signal CTRL previously inputted from the correction circuit 401 is selected.

Next, description will be made of the operation of the interface circuit shown in FIG. 4. In the embodiment, the correction circuit 401 constantly monitors a change in an ambient temperature, and outputs a control signal CTRL according to a monitoring result.

During the stoppage of data transmitting/receiving, a difference in potentials between the D+ terminal and the D− terminal is 0 V, and the detection circuit 106 outputs a signal of "H". The selector 402 selects a control signal CTRL newly inputted from the correction circuit 401 in response to the signal of "H" outputted from the detection circuit 106, and outputs it to the terminators 104 and 105. The terminators 104 and 105 change the resistance values based on the control signal CTRL.

During the execution of data transmitting/receiving, a potential difference is generated between the D+ terminal and the D− terminal, and thus the detection circuit 106 outputs a signal of "L". The selector 402 maintains the output of the currently used control signal CTRL previously outputted from the correction circuit 401 in response to the signal of "L" outputted from the detection circuit 106. The terminators 104 and 105 maintain current resistance values because of no changes made regarding the control signal CTRL inputted from the selector 402.

As described above, since the interface circuits of the present invention comprises the detection circuit 106, the correction circuit 401, and the selecting means (selector) 702, the resistance values of the terminators 104 and 105 can be corrected only during the stoppage of the data transmitting/receiving. Thus, it is possible to suppress the distortion of an output waveform during the data transmitting, and a reception error during the data receiving, which are caused by a change in the characteristic impedance. Moreover, since the interface circuit of the present invention comprises the selecting means (selector) 402, only the switching of the control signal CTRL can be executed during the stoppage of the data transmitting/receiving. Thus, it is possible to accurately correct the resistance values of the terminators even if the period of the stopped state of the data transmitting/receiving (idle state) is short.

Third Embodiment

Next, description will be made of an interface circuit according to the third embodiment of the present invention. The data transfer of the USB 2.0 interface is carried out by dividing time based on a frame concept, and accumulating frames. During one frame, data is transferred by a packet unit. In addition, a packet end code indicating the end of a packet is added to the last part of each packet. Since turnaround time is provided between packets to prevent the clashing of the packets with each other, there is a stopped state of data transmitting/receiving (idle state) when the transfer of one packet is completed. According to the embodiment, the stoppage of data receiving is detected by the packet end code, and the resistance value of the terminator is corrected in response to the result of the detection.

Figure 5:
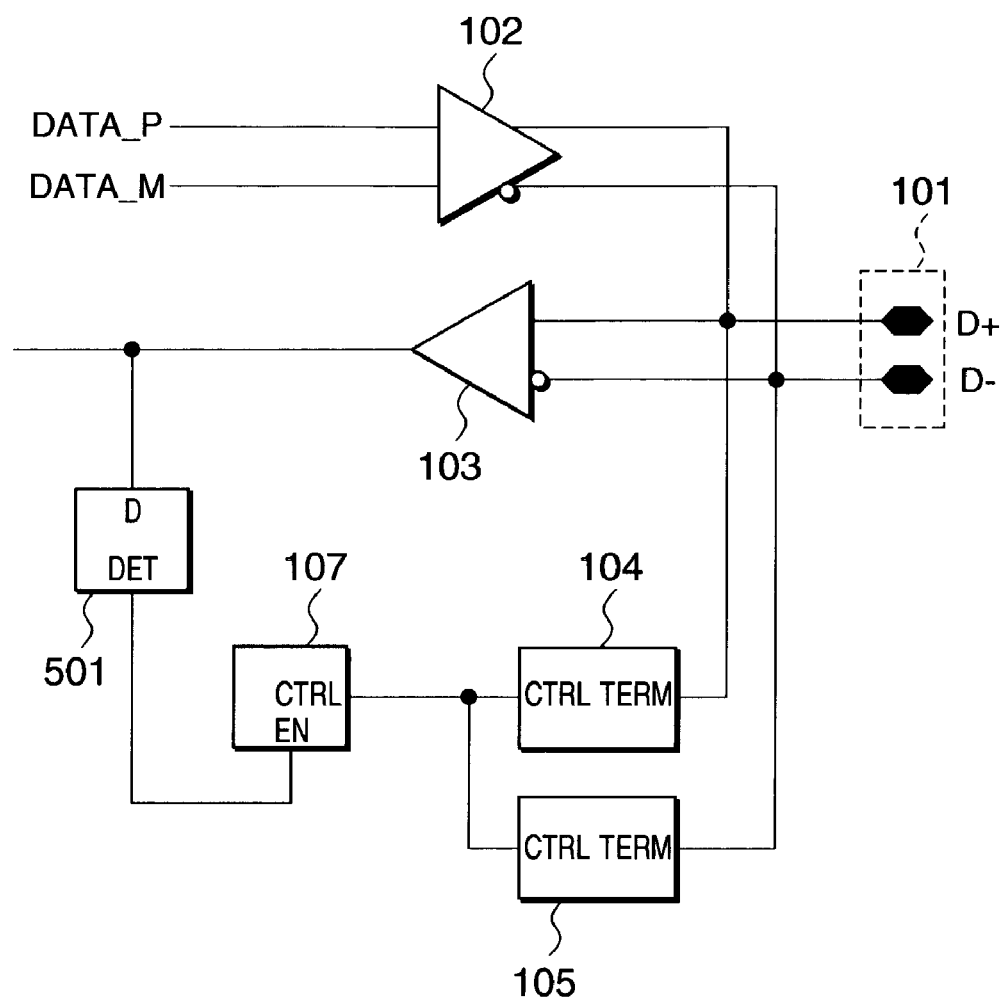
FIG. 5 is a circuit diagram showing an interface circuit according to a third embodiment of the present invention.

First, description will be made of the constitution of the interface of the third embodiment by referring to FIG. 5. FIG. 5 is a circuit diagram showing the interface circuit of the third embodiment of the present invention. The interface circuit of the embodiment shown in FIG. 5 is different from the one shown in FIG. 1 in that as means for controlling the operation of the correction circuit 107, a detection circuit 501 is provided in place of the correction circuit 106 of the interface circuit of the first embodiment. Other components are similar to those of the interface circuit of the first embodiment of FIG. 1, and denoted by similar reference numerals.

The detection circuit 501 includes an input terminal D connected to the output terminal of the data receiver 103, and an output terminal DET connected to the EN terminal of the correction circuit 107. The detection circuit 501 detects a packet end code included in data fetched through the data input/output terminal 101, and outputs a signal of "H" (Detect signal) for a predetermined period. In the USB 2.0 interface, the packet end code must be removed when data received by a physical layer LSI is outputted to an upper layer LSI, and thus means for detecting the packet end code is normally provided in the physical layer LSI.

Figure 6:
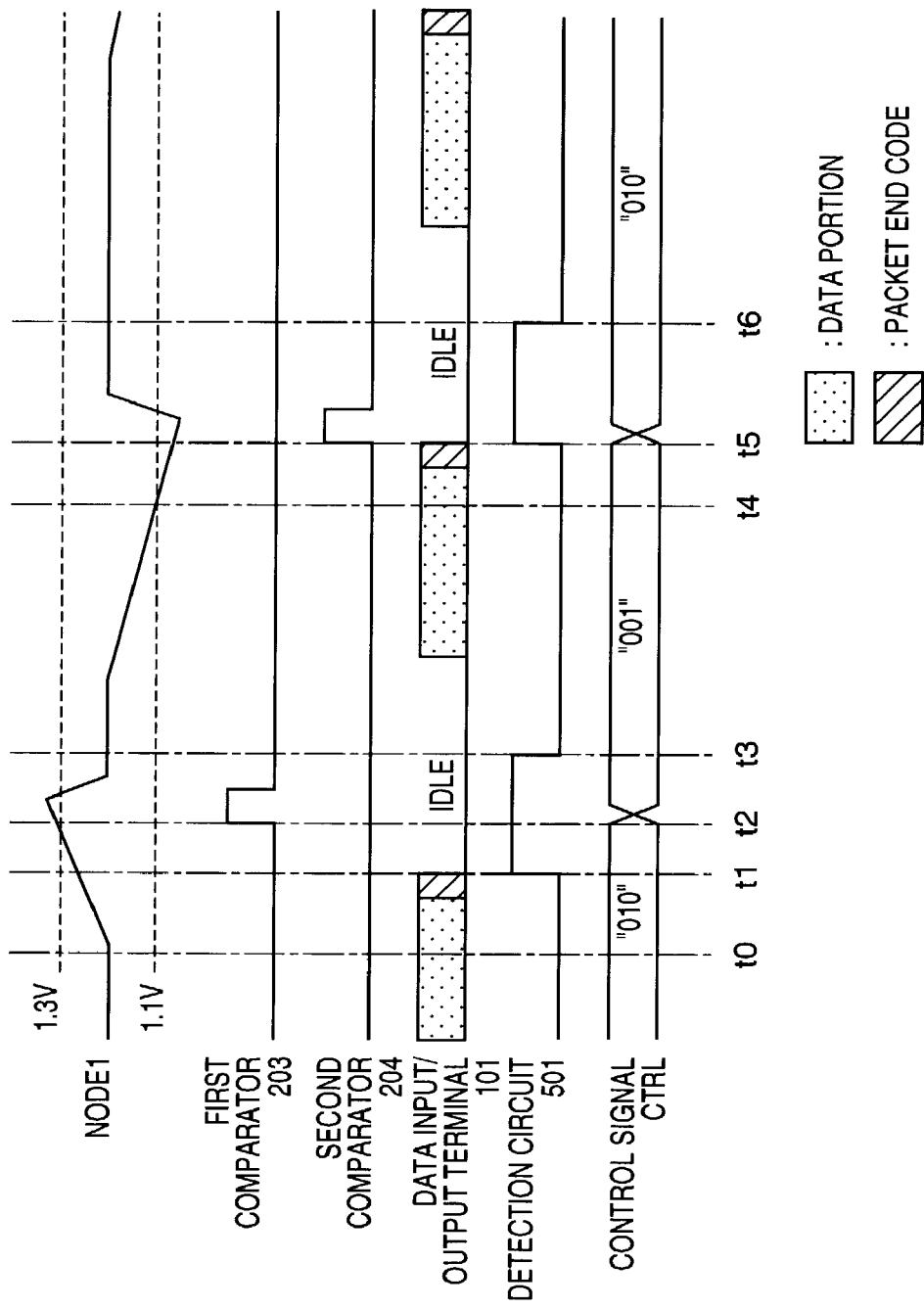
FIG. 6 is a time chart showing an operation of the interface circuit of the third embodiment.

Next, description will be made of the operation of the interface circuit of the third embodiment by referring to FIG. 6. FIG. 6 is a time chart showing the operation of the interface circuit of the third embodiment. Time is shown in the horizontal direction of FIG. 6. In the longitudinal direction of FIG. 6, there are shown in order from above, the potential of the node 1 (graph (1)), the output of the first comparator 203 (graph (2)), the output of the second comparator 204 (graph (3)), the state of the data input/output terminal 101 (graph (4)), the output of the detection circuit 501 (graph (5)), and the control signal CTRL (graph (6)). In the packet shown in the graph (4), a data portion is represented by a dot pattern, and a packet end code by a slash pattern.

At time t0, packet reception is being executed through the data input/output terminal 101 (graph (4)), and the detection circuit 501 outputs a signal of "L" (graph (5)). In this case, the shift register 205 maintains the output of a control signal CTRL of "010".

At time t1, the packet end code reaches the input/output terminal 101 (graph (4)). In the period from the reaching of the packet end code to the reaching of a next packet, the state of no data transmitting is set (idle state; represented by Idle in the drawing). The detection circuit 501 detects the packet end code, and outputs a signal of an "H" level (Detect signal) for a predetermined period (period from time t1 to time t3) (graph (5)).

At time t2, a changed ambient temperature or the like causes a change in the resistance value of the resistor of the correction circuit 107, and the potential of the node 1 exceeds the reference potential (1.3 V) (graph (1)). At this time, a signal of "H" has been inputted to the first comparator 203 of the correction circuit 107, and the first comparator 203 is in a state of being permitted to perform a comparing operation. The first comparator 203 detects that the potential of the node 1 has exceeded the reference potential (1.3 V), and outputs a signal of "H" (DN signal) (graph (2)). The shift register 205 executes a 1-bit down-shifting operation in response to this DN signal, and outputs a control signal CTRL of "001" (graph (6)). The switches (SWc_0, SWc_1, and SWc_2 ) of the correction circuit 107 are respectively set to (ON, OFF, and OFF) in response to the control signal CTRL of "001", and the resistor Rc_0 of the correction circuit 107 is selected. As a result, the potential of the node 1 is lowered to the range of 1.1 V to 1.3 V (graph (1)). In this case, in response to the control signal CTRL of "001", the switches (SWa_0, SWa_1, and SWa_2 ) of the terminator 104 and the switches (SWb_0, SWb_1, and SWb_2) of the terminator 105 are set to (ON, OFF, and OFF). By this operation, the resistors Ra_0, and Rb_0 respectively of the terminators 104 and 105 are selected. As described above, the setting of the potential of the node 1 of the correction circuit 107 in the range of 1.1 V to 1.3 V enables the resistance values of the terminators 104 and 105 to satisfy the characteristic impedance 45 Ω±10%.

At time t3, the output signal of the detection circuit 501 becomes "L" (graph (5)), thus inhibiting the operations of the first and second comparators 203 and 204.

At time t4, a changed ambient temperature or the like causes a change in the resistance value of the resistor of the correction circuit 107, and the potential of the node 1 drops below the reference potential (1.1 V) (graph (1)). At this time, however, since the output signal of the detection circuit 501 is "L" (graph (5)), the first and second comparators 203 and 204 are in operation inhibited states. Accordingly, the shift register 205 maintains the output of the control signal CTRL of "001" (graph (6)).

At time t5, the packet end code reaches the data input/output terminal (graph (4)). The detection circuit 501 detects this packet end code, and outputs a signal of "H" (Detect signal) for a predetermined period (period from time t5 to time t6) (graph (5)). The first and second comparators 203 and 204 of the correction circuit 107 are set in operation permitted state in response to the signal of "H". At this time, since the potential of the node 1 is lower than the reference potential (1.1 V), the second comparator 204 outputs a signal of "H" (UP signal) (graph (3)). The shift resistor 205 executes a 1-bit up-shifting operation in response to the UP signal, and outputs a control signal CTRL of "010" (graph (6)). The switches (SWc_0, SWc_1, and SWc_2) of the correction circuits 107 are respectively set to (OFF, ON, and OFF) in response to the control signal CTRL of "010". As a result, the resistor Rc_1 of the correction circuit 107 is selected, and the potential of the node 1 is increased to the range of 1.1 V to 1.3 V (graph (1)). At this time, the switches (SWa_0, SWa_1, and SWa_2) of the terminator 104, and the switches (SWb_0, SW_1, and SW_2) of the terminator 105 are set to (OFF, ON, and OFF) in response to the control signal CTRL of "010". As a result, the resistors Ra_1 and Rb_1 of the terminators 104 and 105 are selected. As described above, the setting of the potential of the node 1 of the correction circuit 107 in the range of 1.1 V to 1.3 V enables the resistance values of the terminators 104 and 105 to satisfy the characteristic impedance 45 Ω±10%.

At time t6, the output signal of the detection circuit 501 becomes "L" (graph (6)), and the first and second comparators 203 and 204 are set in operation inhibited states.

As described above, the interface circuit of the third embodiment comprises: the detection circuit 501 for detecting the packet end code, and outputting the result of the detection; and the correction circuit 107 for correcting the resistance values of the terminators 104 and 105 by outputting the control signal CTRL to the terminators 104 and 105 in response to the output of the detection circuit 501. Thus, it is possible to suppress the distortion of an output waveform during the data transmitting, and a reception error during the data receiving, which are caused by a change in the characteristic impedance during correction.

Moreover, the interface circuit of the third embodiment corrects the resistance values of the terminators 104 and 105 only for a predetermined period from the detection of the packet end code. Thus, when the number of packets to be received is small, the number of times of correction is accordingly reduced, making it possible to reduce the consumption of current.

Fourth Embodiment

Figure 7:
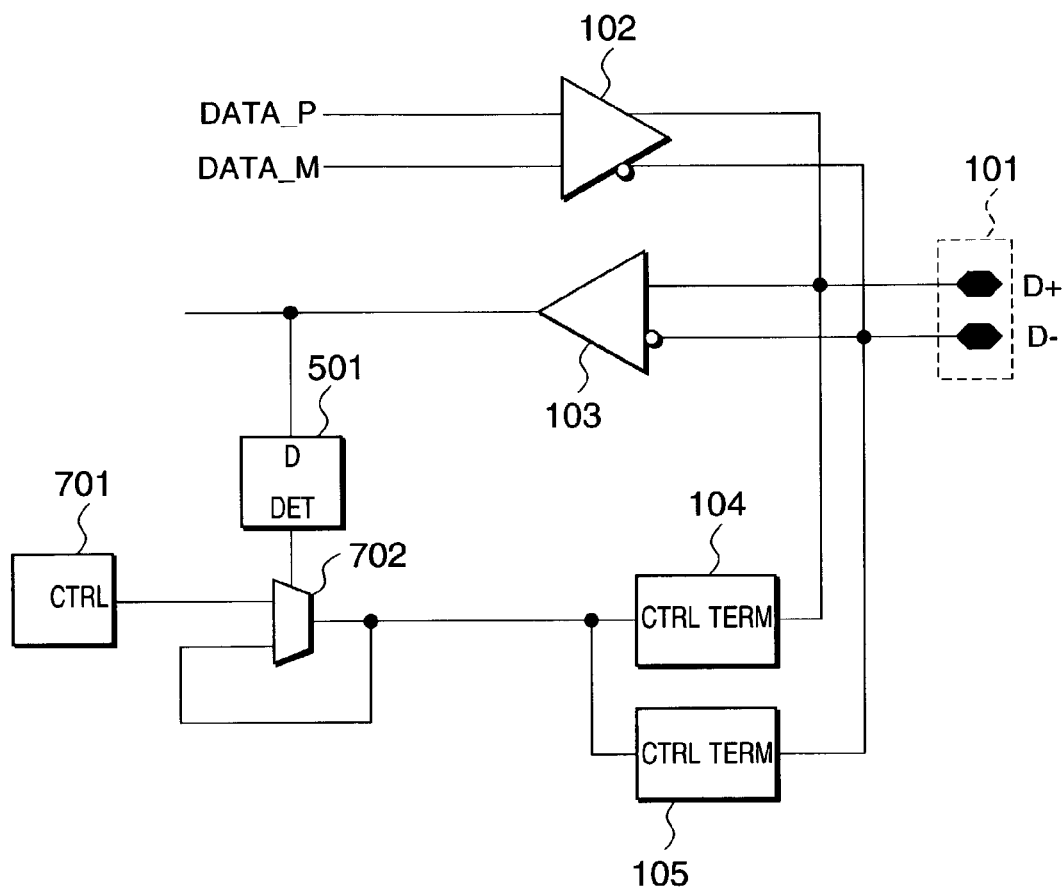
FIG. 7 is a circuit diagram showing an interface circuit according to a fourth embodiment of the present invention.

Next, description will be made of an interface circuit according to a fourth embodiment of the present invention. FIG. 7 is a circuit diagram showing the interface circuit of the fourth embodiment of the present invention. The interface circuit of the embodiment is difference from the one shown in FIG. 5 in that a correction circuit 701 and selecting means 702 are provided. Other components are similar to those of the interface circuit of FIG. 5, and denoted by similar reference numerals. The correction circuit 701 constantly monitors a change in an ambient temperature or the like irrespective of the output signal of the detection circuit 501, and outputs a control signal CTRL. Now, description will be made of a difference between the internal circuit of the correction circuit 701 and the internal circuit of the correction circuit 107 shown in FIG. 4 by referring to the circuit diagram of FIG. 2. The correction circuit 701 is adapted to constantly monitor a change in the potential of the node 1. Accordingly, the EN terminal, and signal lines for connecting the EN terminal with the first and second comparators 203 and 204 provided in the correction circuit 107 of FIG. 2 are removed from the correction circuit 701. The function of the correction circuit 701 is identical to the one, which always applies the signal of "H" to the EN terminal of the correction circuit 107 of FIG. 2. The selecting means 702 is a selector adapted to select a control signal CTRL newly inputted from the correction circuit 701, and a currently outputted control signal CTRL previously inputted from the correction circuit 701 in response to a signal inputted from the detection circuit 401. Hereinafter, the selecting means 702 is referred to as the selector 702. Upon receiving the signal of "H" from the detection circuit 501, the selector 72 selects the control signal newly inputted from the correction circuit 701, and outputs it to the terminators 104 and 105. In addition, upon receiving the signal of "L" from the detection circuit 501, the selector 702 selects the currently outputted CTRL previously inputted from the correction circuit 701, and outputs it to the terminators 104 and 105.

Next, description will be made of the operation of the interface circuit of the present invention. In the embodiment, the correction interface 701 constantly monitors a change in an ambient temperature or the like, and outputs a control signal CTRL based on the result of the monitoring. In other words, the correction circuit 701 constantly monitors a change in the potential of the node 1 of FIG. 2, and outputs the control signal CTRL based on the result of the monitoring.

The detection circuit 401 detects a packet end code captured in the interface circuit, and outputs the signal of "H" for a predetermined period. In response to the signal of "H" inputted from the detection circuit 401, the selector 702 selects the control signal newly inputted from the correction circuit 701, and outputs it to the terminators 104 and 105. The terminators 104 and 105 change their resistance values in response to the control signal CTRL.

The detection circuit 501 outputs a signal of "L" when no packet end codes are detected. In response to the signal of "L" inputted from the detection circuit inputted from the detection circuit 501, the selector 702 selects the currently outputted control signal CTRL previously inputted from the correction circuit 701, and outputs it to the terminators 104 and 105. The terminators 104 and 105 maintain the current resistance values because of no changes made regarding the control signal CTRL inputted from the selector 702.

As described above, since the interface circuit of the embodiment comprises the detection circuit 501, the correction circuit 701 and the selecting means (selector) 702, the resistance values of the terminators 104 and 105 are corrected only when the packet end code is detected. Thus, it is possible to suppress a reception error during data receiving, which is caused by a change in the characteristic impedance. Moreover, since the interface circuit of the embodiment comprises the selecting means (selector) 702, only the switching of the control signal CTRL is executed only when the packet end code is detected. Thus, it is possible to accurately correct the resistance values of the terminators even if turnaround time between transferred packets is short.

As described above in detail, the representative interface circuit of the present invention comprises: the detection circuit for the predetermined states of the potentials of the first and second terminals, and thus detecting the stoppage of the data transmitting/receiving; and the correction circuit for outputting a control signal to the terminator in response to the output signal of the detection circuit. The correction of the resistance value of the terminator is inhibited during the data transmitting/receiving, and permitted during the stoppage of the data transmitting/receiving. As a result, it is possible to suppress the distortion of an output waveform during the data transmitting, and a reception error during the data receiving, which are caused by a change in the characteristic impedance during correction.

What is claimed is:

1. An interface circuit comprising:
    a data input/output terminal that includes a first terminal for inputting/outputting a first signal component of a differential signal, and a second terminal for inputting/outputting a second signal component of the differential signal, the second signal component having a phase reverse to that of the first signal component of the differential signal;
    a data driver for outputting data through said data input/output terminal;
    a data receiver for fetching data through said data input/output terminal;
    a detection circuit for detecting a stoppage of data transmitting/receiving by detecting predetermined states of potentials respectively at the first and second terminals;
    a correction circuit for outputting a control signal when a detection result of said detection circuit shows the stoppage of data transmitting/receiving; and
    a terminator connected to the data input/output terminal and receiving the control signal from the correction circuit, the terminator having a resistance value that is corrected in response to the control signal.

2. An interface circuit according to claim 1, wherein said correction circuit includes: a plurality of resistors connected to a node; a plurality of switches serially connected respectively to the resistors; a current source connected to the node for supplying currents to the resistors; and a comparator circuit for comparing a potential at the node with reference potentials while the data transmitting/receiving is in a stopped state, and outputting the control signal to the switches and said terminator according to a result of the comparison.

3. An interface circuit according to claim 2, wherein the comparator circuit includes: a first comparator for comparing the potential at the node with an upper limit reference potential at an upper end of a predetermined range while the data transmitting/receiving is in a stopped state, and outputting a result of the comparison; a second comparator for comparing the potential at the node with a lower limit reference potential at a lower end of the predetermined range, and outputting a result of the comparison; and a register for outputting the control signal in response to the outputs of the first and second comparators.

4. An interface circuit according to claim 1, wherein said terminator includes: a plurality of resistors connected in parallel to each other; and a plurality of switches serially connected respectively to the resistors.

5. An interface circuit according to claim 1, wherein said terminator includes: a plurality of transistors connected in parallel to each other.

6. An interface circuit comprising:
    a data input/output terminal that includes a first terminal for inputting/outputting a first signal component of a differential signal, and a second terminal for inputting/outputting a second signal component of the differential signal, the second signal component having a phase reverse to that of the first signal component of the differential signal;
    a data driver for outputting data through said data input/output terminal;
    a data receiver for fetching data through said data input/output terminal;
    a detection circuit connected to said data input/output terminal to detect a packet end code included in the data fetched through said data input/output terminal, and then output a result of the detection;
    a correction circuit for outputting a control signal in response to the output of said detection circuit; and
    a terminator connected to the data input/output terminal and receiving a control signal from the correction circuit; the terminator having a resistance value that is corrected in response to the control signal.

7. An interface circuit according to claim 6, wherein said correction circuit includes: a plurality of resistors connected to a node; a plurality of switches serially connected respectively to the resistors; a current source connected to the node for supplying currents to the resistors; and a comparator circuit for comparing a potential at the node with reference potentials and outputting the control signal to the switches and said terminator according to a result of the comparison.

8. An interface circuit according to claim 7, wherein the comparator circuit includes: a first comparator for comparing the potential at the node with an upper limit reference potential at an upper end of a predetermined range in response to the output of said detection circuit, and outputting a result of the comparison; a second comparator for comparing the potential at the node with a lower limit reference potential at a lower end of the predetermined range in response to the output of the detection circuit, and outputting a result of the comparison; and a register for outputting the control signal in response to the outputs of the first and second comparators.

9. An interface circuit according to claim 6, wherein said terminator includes: a plurality of resistors connected in parallel to each other; and a plurality of switches serially connected respectively to the resistors.

10. An interface circuit according to claim 6, wherein said terminator includes: a plurality of transistors connected in parallel to each other.

11. An interface circuit comprising:
    a data input/output terminal that includes a first terminal for inputting/outputting a first positive-phase signal component of a differential signal, and a second terminal for inputting/outputting a second signal component of the differential signal, the second signal component having a phase reverse to that of the first signal component of the differential signal;
    a data driver for outputting data through said data input/output terminal;
    a data receiver for fetching data through said data input/output terminal;
    a detection circuit for detecting a stoppage of data transmitting/receiving carried out through said data input/output terminal;
    a correction circuit for outputting a control signal;
    selecting means for selecting and outputting either a new control signal inputted to the selecting means from said correction circuit, or a control signal that was previously inputted to the selecting means from said correction circuit and is currently being outputted by the selecting means, in response to an output of said detection circuit; and a terminator connected to the data input/output terminal and receiving the control signal selected by the selecting means, the terminator having a resistance value that is corrected in response to the control signal selected by the selecting means.

12. An interface circuit according to claim 11, wherein said correction circuit includes: a comparator for detecting a difference in potentials between the first and second terminals.

13. An interface circuit according to claim 11, wherein said detection circuit is connected to an output terminal of said data receiver to detect a packet end code included in the data fetched through said data input/output terminal.

14. An interface circuit according to claim 11, wherein said correction circuit includes: a plurality of resistors connected to a node; a plurality of switches serially connected respectively to the resistors; a current source connected to the node for supplying currents to the resistors; and a comparator circuit for comparing a potential at the node with reference potentials and outputting the control signal to the switches and the selecting means according to a result of the comparison.

15. An interface circuit according to claim 14, wherein the comparator circuit includes: a first comparator for comparing the potential at the node with an upper limit reference potential at an upper end of a predetermined range, and outputting a result of the comparison; a second comparator for comparing the potential at the node with a lower limit reference potential at a lower end of the predetermined range, and outputting a result of the comparison; and a register for outputting the control signal in response to the outputs of the first and second comparators.

16. An interface circuit according to claim 11, wherein said terminator includes: a plurality of resistors connected in parallel to each other; and a plurality of switches serially connected respectively to the resistors.

17. An interface circuit according to claim 11, wherein said terminator includes: a plurality of transistors connected in parallel to each other.

* * * * *